United States Patent [19]
Taylor, deceased et al.

[11] 4,023,032
[45] May 10, 1977

[54] LIGHT STANDARD FOR BICYCLES

[76] Inventors: Jack E. Taylor, deceased, late of San Jose, Calif.; Carol L. Taylor, administratrix, 376 Los Pinos Way, San Jose, Calif. 95123

[22] Filed: Nov. 18, 1974

[21] Appl. No.: 524,803

[52] U.S. Cl. .............................. 240/58; 240/7.55; 340/134
[51] Int. Cl.² .......................................... B62J 5/00
[58] Field of Search ............... 240/7.55, 6.42, 58, 240/90; 340/84, 87, 119, 134

[56] References Cited
UNITED STATES PATENTS

| | | | |
|---|---|---|---|
| 2,507,919 | 5/1950 | Mazzeo | 240/6.42 X |
| 3,696,334 | 10/1972 | Demeter | 240/90 |
| 3,862,410 | 1/1975 | Maxwell | 240/7.55 |

*Primary Examiner*—Edna M. O'Connor
*Attorney, Agent, or Firm*—John J. Leavitt

[57] ABSTRACT

Presented is a light weight and easily attachable light standard including a battery case for attachment to the conventional rear axle of a bicycle, and including an upwardly extending flexible standard on the top end of which is mounted a light energized by electrical energy from the battery contained in the battery case, and a pennant attached to the standard below the light. The battery case includes apertured gussets for supporting the flexible standard.

3 Claims, 5 Drawing Figures

U.S. Patent    May 10, 1977    4,023,032
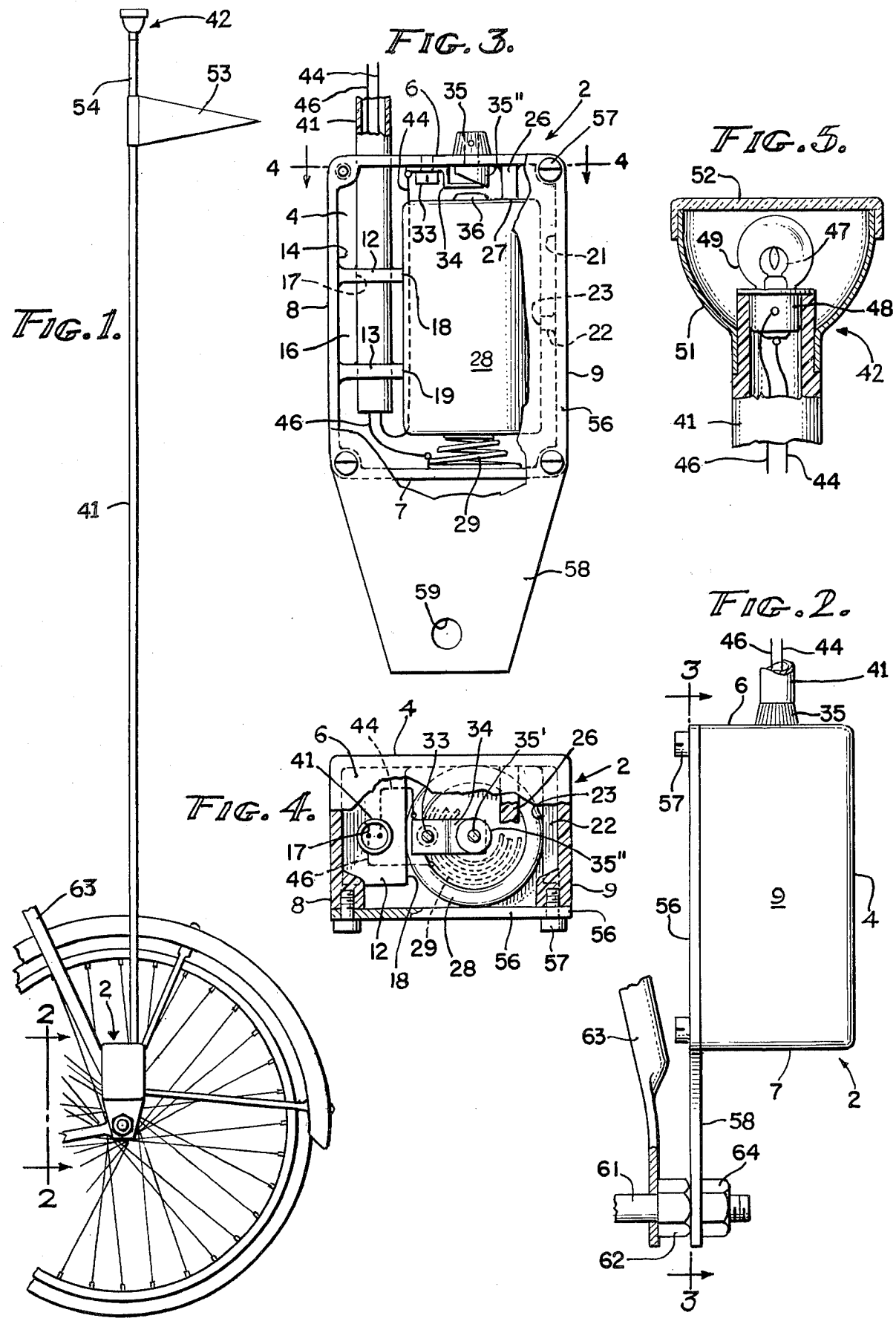

LIGHT STANDARD FOR BICYCLES

BACKGROUND OF THE INVENTION

It is a matter of common knowledge that the numbers of bicycles being used today is much greater than was being used only a short time ago. Additionally, such numbers are increasing by the tens of thousands, even to the extent that in many municipalities special bicycle lanes have been designated on the streets to accommodate bicycle traffic. Notwithstanding that such special bicycle lanes are provided, it is also a truism that bicycles and their riders are difficult to see in the daytime and almost impossible to see at night by motorists unless means are used to render them more visible. Accordingly, in many municipalities, ordinances have been passed requiring reflectors of certain prescribed cross-sectional area to be attached to the bicycle. In California for instance, a bicycle shop is required by law to mount such reflectors before a new bicycle leave the shop. Accordingly, it is one of the objects of the present invention to provide means for attachment to a bicycle which renders the bicycle more visible in both daylight and nighttime hous by virtue of the fact that the means calls attention to the presence of the bicycle and rider.

Reflectors of various types have been utilized, and some reflectors have even been mounted in elevated positions in regard to vehicles other than bicycles. So far as it is known, a light standard has not been invented which is easily applicable to a bicycle. Accordingly, another object of the invention is the provision of warning means for a bicycle which includes an easily mounted battery case in conjunction with an elongated flexible wand or standard on the upper end of which is mounted an electrically energizable light.

In most of the light standard structures with which I am familiar, the mounting of the light standard poses a problem in that in most instances the mounting means are cumbersome and complicated, such as illustrated in U.S. Pat. No. 3,696,334 which teaches a vehicle warning lamp device mounted on a motorcycle fender and seat structure. Since the cost of the bicycle is relatively inexpensive compared to the cost of a motorcycle, it follows that any light standard designs specifically for use in connection with the bicycle must be uncomplicated, simple to manufacture and mount, and simple to operate once the light is mounted. Accordingly, another object of this invention is to provide a bicycle light structure that possesses these advantages.

SUMMARY OF THE INVENTION

In terms of broad inclusion, the bicycle light structure comprises a housing adapted to be securely yet detachably mounted on the rear axle of the rear bicycle wheel and adapted to enclose therewithin a battery source of electric power for an electric light disposed on the upper end of a mast or staff so that the light is visible in all directions. The staff serves also to support a pennant which aids visibility of the bicycle rider during daylight hours. Appropriate switch means are provided on the housing operable to energize or de-energize the light.

BRIEF DESCRIPTION OF THE DRAWINGS

FIG. 1 is a fragmentary view in elevation illustrating the rear wheel assembly of a bicycle, with the bicycle light device attached thereto.

FIG. 2 is an enlarged front elevational view taken in the direction indicated by the arrows 2—2 in FIG. 1, and shown full size to illustrate the mounting of the bicycle light device on the rear axle of the bicycle.

FIG. 3 is a fragmentary elevational view shown in full size, with a portion of the housing broken away to reveal the internal construction and arrangement of parts.

FIG. 4 is a full size plan view, portions of the housing being broken away to better illustrate the relationship of parts within the housing.

FIG. 5 is an elevational view of the light structure shown approximately three times actual size, a portion of the staff or whip on which it is mounted being shown in elevation.

DESCRIPTION OF THE PREFERRED EMBODIMENT

In terms of greater detail, the bicycle light device of the invention comprises a housing designated generally by the numeral 2 and including a generally rectangular box-like member 3 closed on one broad side by a wall 4, and on opposite ends by end walls 6 and 7. Side walls 8 and 9 serve to complete the box, which is open on its remaining side. The box-like housing is preferably injection molded from an appropriate synthetic resinous material such as one commonly known as "ABC Plastic", and internally of the box-like housing 2 there are molded a pair of gussets 12 and 13 disposed integrally between the inner surface 14 of side wall 8 and the inner surface 16 of the wall 4. The gussets are generally rectangular in form as illustrated best in FIG. 4, and each is provided with a generally centrally disposed aperture 17 for purposes which will hereinafter be explained. The gussets 12 and 13 are provided with inner edges 18 and 19 which lie in a parallel plane which in turn is parallel to the side wall 8, and as shown best in FIG. 3, the gussets 12 and 13 are spaced apart so that they divide the distance between end walls 6 and 7 into three approximately equal sections. On the inside surface 21 of side 9 of the housing, there is provided a rib-like member 22 which is disposed approximately midway between end walls 6 and 7, so that the inner edge 23 of the rib 22 lies approximately midway between the inner edges 18 and 19 of gussets 12 and 13.

Molded as an integral part of the internal surface 24 of end wall 6 is still another rib 26 having an internal edge 27. The gussets 12 and 13, and ribs 22 and 26 are thus positioned and proportioned, as illustrated in FIG. 3, to cradle a dry cell battery 27 so that it is retained within the housing in a stable position. Once inserted into the housing, the dry cell battery is resiliently biased in an upward direction against the inner edge 27 of rib 26 by an appropriate spring 29 disposed in the space between the lower surface 31 of the battery and the inner surface 32 of end wall 7. While a coil spring has been shown, it is obvious that a leaf spring could be used instead.

The upper wall 6 of the housing is provided with an aperture 32 axially aligned with the aperture 17 formed in gussets 12 and 13, and the top wall 6 is also provided with a terminal screw 33 threadably engaging the top wall 6 and securely anchoring a resilient terminal plate 34 the free end of which is adapted to be selectively displaced into engagement with the terminal 36 of the dry cell battery by manipulation of an appropriate knob 35 mounted on the top wall 6. It will thus be seen that by manipulation of the ON-OFF knob 37, the terminal 33 may be connected to the center post or center terminal of the battery, by the resilient plate 34 which is displaced downwardly by the cam 35" connected to knob 35 by stem 35' while the outer housing of the battery, constituting another terminal thereof, is conductively connected by the spring 29.

Mounted on the housing 2, is a staff 41 extending upwardly and terminating in a light assembly designated generally by the numeral 42. The staff is preferably formed from a hollow synthetic resinous tube. The lower end portion 43 of the staff passes through the aperture 32 in the top wall 6 of the housing, passes also through the aperture 17 in gussets 12 and 13, and is appropriately cemented therein so as to be securely anchored to the housing. Since the staff 41 is hollow, it provides a space through which leads 44 and 46 may pass upwardly through the staff to be connected respectively to the filament 47 and base 48 of an electric light bulb 49 mounted on the upper end of the staff. The light assembly 42 includes a generally concave and transparent housing portion 51 appropriately secured in any suitable manner, such as adhesively, to the upper end of the staff, and having its open upper end convered by a plate 52 which may or may not be transparent. Thus, when the ON-OFF knob 37 on the housing 2 is manipulated to energize the light assembly 42, the glow from the light bulb 49 may be seen in all directions.

Since the bicycle safety device is useful also during daylight hours, a pennant 53 is appropriately secured to the upper end portion 54 of the staff by any suitable means such as by a removable clamp or by adhesive.

To mount the housing with the attached staff on the bicycle, there is provided a closure plate 56, conveniently formed from 14 gauge aluminum and having a generally rectangular section adapted to completely close the open side of the housing opposite the side wall 4. Appropriate screws 57 are provided for this purpose adapted to pass through appropriate apertures in the plate and threadably engage the housing disposed therebeneath. The mounting plate is also provided with an extension or mounting portion 58 having an enlarged aperture 59 therein proportioned to slip snugly over the threaded end of the rear axle 61 of the bicycle. As illustrated in FIG. 2, the rear axle is provided with a first nut 62 which secures the rear wheel to the frame 63 of the bicycle. The mounting plate 56 is oriented so that the staff extends vertically upwardly and the aperture 59 is engaged on the axle over the nut 62. A second nut 64 is then threadably engaged on the axle so as to clamp the mounting plate with the attached housing and staff securely to the rear axle of the bicycle. It has been found that such a connection, while being simple and expedient is nevertheless secure, there being no tendency for the housing and staff to loosen thereon.

It has been found through experimentation with staffs of different diameters that a staff having a small enough diameter to provide flexibility in the staff will insure movement of the light assembly 42 when the bicycle is being operated, thus attracting the attention of an observer to the fact that a bicycle rider is in the area. It has been found that a staff having an outside diameter of approximately 5/16 of an inch and an overall length of about 6 feet is satisfactory.

Having thus described the invention, what is claimed to be new and novel and sought to be protected by letters patent is as follows:

1. A safety standard for a bicycle comprising:
   a. a housing assembly adapted to be detachably secured to the rear axle of a bicycle wheel;
   b. an elongated and resiliently flexible staff having an integral end portion extending into and anchored in said housing assembly;
   c. an energizable light assembly mounted on the other end of said staff remote from said housing assembly; and
   d. means carried within said housing assembly to selectively energize said light assembly;
   e. said housing assembly comprising a generally hollow box-like structure including a face and end and side walls, gussets associated with one of said side walls, said gussets and one of said end walls being provided with apertures through which the associated end of said staff extends and to which said staff is securely anchored.

2. The combination according to claim 1, in which said housing assembly includes a rib associated with the opposite side wall, a second rib associated with one of said end walls, and a battery disposed in said hollow housing within the limits imposed by said gussets and ribs.

3. The combination according to claim 1, wherein said box-like hollow structure including an open side, a mounting plate closing the open side of said boxlike structure and including a mounting portion adapted to be detachably secured to the rear axle of the bicycle wheel.

* * * * *